Patented Apr. 17, 1951

2,549,538

UNITED STATES PATENT OFFICE 2,549,538

METHOD FOR DEPOLYMERIZING POLYSTYRENE

William J. Sparks, Cranford, and David W. Young, Roselle, N. J., assignors to Standard Oil Development Company, a corporation of Delaware No Drawing. Application August 25, 1945, Serial No. 612,722

4 Claims. (Cl. 260—93.5)

This invention relates to low temperature catalytic treatment of a synthetic resin. More specifically, it relates to the formation and modification treatment of styrene polymers and similar polymers at low temperatures with a Friedel-Crafts catalyst in a homogeneous solution to produce valuable blending resins.

Polymers of styrene were first produced over a century ago and have been the most extensively studied polymeric compounds. Styrene autopolymerizes at room temperature on long standing for months to polymers of high molecular weight, about 300,000, but to polymerize styrene more rapidly with or without the aid of a catalyst, an elevated temperature is used. Polymerization in a reasonable length of time, such as a number of hours, requires temperatures of 100° C. or higher, approaching the boiling point of the monomer 146° C. Still higher polymerization temperatures result in a more brittle polystyrene. The resulting resins were found to differ in strength, flowing qualities, solubility, and other properties related in some way to the structure and molecular weights of the polymers even though they appeared identical to the eye. On heating to temperatures above 300° C. polystyrene is depolymerized to the monomer.

Styrene polymers produced for commercial purposes have generally been required to have molecular weights in the range of about 30,000 to 200,000 regulated by conditions of formation, but much of the delay in commercializing styrenes, as these polymers are called, has been due to the difficulty of control and of obtaining more rapid polymerization. The lower polymers (20,000 molecular weight and below) have low molecular strength and little commercial use.

Attempts were made to produce polystyrenes using stannic chloride and boron fluoride at moderate temperatures above room temperature but the products were of very low molecular weight liquids (3,000 molecular weight and lower). Derivatives of styrene, such as alkyl substituted styrenes, and other homologues, or similar aryl alkene compounds, having an aromatic nucleus with an alkenyl or ethylenic side chain, were found to behave in a similar fashion to that of styrene but in general forming polymers of even lower molecular weight. These attempts were always unsuccessful for producing commercially useful resins, but now it is determined that the procedures used lacked certain important factors of control, such as adequate temperature reduction and adjustment, the proper use of solvents with an effective catalyst, and time control.

An object of this invention is to provide an improved method of catalytically producing high yields of modified styrene resins rapidly at low temperatures.

Another object of this invention is to provide new types of resins which have improved useful properties by a catalytic treatment of aryl alkene polymers.

A further object of this invention is to provide an efficient method of modifying resins at low temperatures to useful resins of selected molecular weights or intrinsic viscosities.

Attainment of the foregoing and further objects will be understood from the following description.

In accordance with the present invention, it is now ascertained that if the polymerizable aryl alkene monomers are kept in solution with an active Friedel-Crafts catalyst in a suitable solvent, while maintaining a very low polymerization temperature, e. g., —78° C. or —100° C., the polymerization proceeds very rapidly and satisfactorily to give in about 3 to 10 minutes nearly 100% yields of high molecular weight polymers (e. g., about 80,000 molecular weight and above); then on raising the temperature of the solution, if the polymers are kept in solution with the active catalyst, they become depolymerized and modified under control, as desired, in a reasonably short time.

The type of solvent, simple or mixed, must have the property of maintaining the polymers in solution at the modifying reaction temperature without deactivating the catalyst, i. e., so as not to form a deactivated catalyst complex. Such a solvent is of a limited type, preferably an alkyl halide, such as methyl or ethyl chloride, or methylene chloride. The low temperature solvents for the polymers may be mixed with a limited quantity of other liquid compounds to form suitable mixed solvents, even though said other compounds by themselves are not sufficiently miscible at all low reaction temperatures. Liquefied $C_2$ and $C_3$ hydrocarbons, such as ethane, ethylene, and propane, may thus be mixed with an alkyl halide solvent.

Methyl chloride, having a boiling point of —23.7° C. and a melting point near —100° C., may be used as the solvent at polymerization temperatures from about —80° C. to about —103° C. Dry methylene chloride having a boiling point of 39.8° C. and a freezing point of —97.6° C. may be used similarly. Ethyl chloride, having a boiling point of 12.2° C. and a melting point near —138° C., may be used at still lower temperatures, for example, with liquefied nitrogen as an external refrigerant, but greater dilution of the monomer and polymer is required in maintaining a homogeneous reaction solution at such lower temperatures. The low boiling hydrocarbons, such as propane and ethylene, cannot be used as solvents by themselves to obtain a homogeneous solution at temperatures below about —40° C., because they tend to precipitate the polymer from solution at lower temperatures.

A preferred catalyst for the polymerization and modifying treatment is aluminum chloride, but other Friedel-Crafts type catalysts which are active and soluble in the required types of solvents may be used. The Friedel-Crafts catalysts include boron fluoride, $AlBr_3$, $AlBr_2Cl$, $Al_2Br_5Cl$, [$Al_2Br_5Cl \cdot AlOBr$], $TiCl_4$, $TiCl_3Br$ and others listed in the article by N. O. Calloway in "Chemical Reviews" published by the American Chemical Society at Baltimore in 1935, vol. XVII, No. 3, page 327.

A minimum suitable concentration of the catalyst in liquid solvent is approximately 0.1%. An optimum concentration of aluminum chloride catalyst is above about 0.4 g. per 100 ml. to 0.8 g./100 ml. in methyl chloride, the maximum being approximately 6.0% in ethyl chloride.

In preparing the reaction solution from about 1 to 9 parts of diluent or solvent may be used with 1 part of the monomeric reactant, the minimum ratio being that required to keep the monomeric reactant in solution at the polymerization temperature. The polymerization to high intrinsic viscosities is improved through the use of lower diluent ratios (2:1 to 4:1) and higher concentration of catalyst coupled with good dispersion, at lower polymerization temperatures. However, these variables are interrelated and present complications. For example, after the diluent ratio is lowered the viscosity of the solution is increased with the result that agitation and heat transfer are impaired. Similarly, lowering of the polymerization temperature increases the viscosity of the solution.

In rapidly forming the high molecular weight polymers that are tough solid resins, certain conditions are to be fulfilled. The monomeric reactant is polymerized effectively to high molecular weight polymers at temperatures maintained substantially below about −78° C. and preferably below −100° C. The polymerization temperature may be maintained by use of an internal or external refrigerant, or both. For example Dry Ice (solid $CO_2$) may be used as an internal refrigerant at −78° C. The reaction may be carried out under ordinary atmospheric pressure, but since the reaction is carried out in liquid phase, subatmospheric or superatmospheric pressures may be applied in controlling vaporization of volatile components in the reaction solution and the temperature of the solution.

The catalyst solution may be added in regulated small amounts to the solution of the monomeric reactant, or the reactant and the catalyst may be brought together in continuous streams to form a continuous process. The polymerization of the monomeric reactant proceeds upon admixture of the catalyst. A substantial amount of heat is liberated by the polymerization, but by maintaining the reaction solution at the low polymerization temperature for a period of about 3 to 10 minutes, the polymerization proceeds to form high molecular weight polymers.

After the high molecular weight polymers have been formed, if they are allowed to remain homogeneously in contact with the active catalyst and the temperature of the solution is raised, e. g., to above −78° C., they undergo a depolymerization and modification. This modifying treatment can be controlled to obtain new types of resins having desired characteristics.

For the purpose of illustration, but without limiting the invention, the following examples on the procedure and results are given:

EXAMPLE 1

Two liters of C. P. styrene were added to three liters of pure methyl chloride. The liquid mixture was placed in a jacketed copper reactor and liquid ethylene was contained in the jacket for external cooling. When the temperature of the methyl chloride-styrene solution was −103° C., catalyst was added to the solution while the solution was agitated. The catalyst was a solution of aluminum chloride in methyl chloride at a concentration of 0.62 g. per 100 ml., and this solution was added at the rate of 200 ml. per minute until the total volume of catalyst solution added was 620 ml. After a period of about 3 minutes, during which all the catalyst solution had been added, about 25 ml. of isopropyl alcohol was added to the reaction solution to precipitate solid polymers from the solution and deactivate the catalyst at −103° C. The excess methyl chloride solvent was removed from the polymer product by vaporization, when the solid product was washed with water and dried at 50° C. for 12 hours. The solid polymer product was colorless, had a heat softening point of 97° C. and an intrinsic viscosity in toluene of 1.4 at 20° C. The polymer product gave a clear solution in toluene. The yield was 90% by weight.

A compilation of data on a number of runs in polymerizing styrene is given in the following table:

Table I

| Run No. | Volume of Styrene | Temp. of Polymerization | Time of Polymerization | Type of Catalyst $AlCl_3$-MeCl | Vol. of Catalyst Used | Remarks Yield | Int. Vis. of Resin in Toluene |
|---|---|---|---|---|---|---|---|
| | Ml. | ° C. | Min. | | Ml. | Per cent | |
| 1 | 50 | −101.3 | 4 | 0.44 g./100 ml. | 50 | 99 | 1.3 |
| 2 | 300 | −101.3 | 4 | do | 210 | 100 | 1.4 |
| 3 | 250 | −101.3 | 5 | do | 110 | 84 | 1.5 |
| 4 | 1,000 | −101.3 | 5 | do | 270 | 90 | 1.4 |
| 5 | 2,000 | −101.3 | 7 | do | 440 | 92 | 1.3 |
| 6 | 75 | −101.3 | 3 | do | 25 | 91 | 1.4 |
| 7 | 500 | −101.3 | 10 | do | 165 | 94 | 1.5 |

(Diluent ratio equals 2 vol. MeCl per vol. of styrene).

The high molecular weight styrene polymers made at below −100° C. are tough solid resins notably clear and transparent. These styrene resins have excellent molding qualities and are superior in some respects to polystyrene molding resins made by the high temperature polymerization methods.

A few constants on the styrene polymer molding resins produced by the low temperature catalytic polymerization are as follows:

Compression molding temperatures °F. 200–400
Compression molding pressure, lbs./sq. in. 1000–5000
Injection molding temperature, °F. 250–550

A quantitative comparison of physical properties between the resins made by the low temperature technique and commercial molding resins made by high temperature polymerization are given in the following table:

Table II
Method of Preparation

| | Polystyrene formed at— | |
|---|---|---|
| | −103° C. in Methyl Chloride with AlCl₃ Catalyst | A Temperature above 100° C. with Peroxide Initiation |
| Intrinsic Viscosity in Toluene at 20° C | 1.43 | 1.44 |
| Average Molecular Weight | 86,500 | 86,750 |
| Tensile Strength, lb./sq. in | 8,000 | 7,220 |
| Ultimate Elongation____percent | 3.3 | 3.0 |
| Heat Softening Point, °C | 101 | 110 |

The factors responsible for the modification of the styrene polymers when they are allowed to remain homogeneously in solution with the active catalyst at a raised temperature are difficult to determine at this time; however, it has been found that the polymers undergo a change in intrinsic viscosity and a change which appears to involve isomerization. The same kind of modification is obtained by treating high molecular weight polystyrene formed at high temperatures (above 100° C.) with benzoyl peroxide type catalyst. The polystyrene is dissolved in the Friedel-Crafts catalyst solution and the isomerization takes place at some temperature above −78° C., e. g., at −24° C. or higher.

The modification treatment may be controlled to obtain a definite grade of resin suitable for blending purposes or other uses. Effects of the modification treatment are illustrated by the following examples:

Table III
MODIFICATION TREATMENT

| | | Intrinsic Viscosity In Toluene at 20° C. |
|---|---|---|
| A | Control—Polystyrene dissolved in methyl chloride, reprecipitated, and mill dried | 1.16 |
| B | 10 g. Polystyrene (same as in the Control A) dissolved in methyl chloride with 0.8 g. of aluminum chloride per 100 cc. of methyl chloride solution at −24° C. for 45 minutes. Polymer reprecipitated by admixture of acetone and mill dried | 0.87 |
| C | 10 g. Polystyrene (same as in the Control A) dissolved in methyl chloride with 0.8 g. of aluminum chloride per 100 cc. methyl chloride solution at −24° C. for a period in which all the methyl chloride evaporated. Polymer mill dried | 0.54 |
| D | Control—Polystyrene dissolved in ethyl chloride, reprecipitated and mill dried | 1.17 |
| E | 10 g. Polystyrene (same as in the Control D) dissolved in ethyl chloride with 5.04 g. of aluminum chloro bromide (AlBr₂Cl) per 100 cc. of ethyl chloride at 5° C. for 20 minutes. Polymer reprecipitated by admixture of acetone and mill dried | 0.58 |
| F | 10 g. Polystyrene (same as in the Control D) dissolved in ethyl chloride with 7.3 g. of AlBr₃ per 100 cc. of ethyl chloride at 5° C. for 20 minutes. Polymer reprecipitated by admixture of acetone and mill dried | 0.48 |
| G | 10 g. Polystyrene (same as in the Control D) dissolved in 600 grams of a 50-50 wt. mixture of methyl chloride-ethyl chloride. AlCl₃ (0.85 g.) was present per 100 cc. of mixed halide at −25° C. for 20 minutes. Polymer reprecipitated by admixture of acetone and mill dried | 0.84 |

The modification of the polymer by this method is believed to have certain technical advantages over direct formation of the relatively lower molecular weight polymers, because the modification treatment can be controlled with precision and the molecular weight spread can be kept within a narrow band. For example, if the monomer is polymerized at, say, −25° C., the resulting polymers have widely varying molecular weights that average to give an internal viscosity of only 0.18, and at −40° C. to give an intrinsic viscosity of only 0.19, but with the modifying treatment a high molecular weight polymer having an intrinsic viscosity above 1.0 may be modified at a temperature above −78° C., e. g., at −25° C., to have any desired intrinsic viscosity in the range below 1.0, e. g., an intrinsic viscosity of 0.9, 0.8, etc. down to 0.2, or lower.

Tests have shown that the modified styrene polymer with a relatively lower molecular weight (internal viscosity reduced to below 1.0) is more compatible with various copolymers of styrene than is the higher molecular weight polystyrene (above 80,000 molecular weight), particularly when the copolymer contains 40% or more of styrene combined therein with an olefin.

Modified styrene resins (made as described in paragraphs B and G of Table III) were compounded on a rubber mill with an isobutylene (40%)-styrene (60%) copolymer in preparing a self-supporting film. Tests showed that the modified resin blended in a proportion of 10% was compatible. The surface tack of the copolymer was reduced. The film showed low moisture vapor penetration.

Similar tests were made by compounding the modified resins (made as described in paragraphs B, C, E, F, and G of Table III) on a warm rubber mill with the following copolymers: isobutylene (50%)-styrene (50%); isoprene (50%)-styrene (50%); butadiene (30%)-alpha methyl styrene (70%); styrene (60%)-dichloro styrene (40%); styrene (20%)-isobutylene (80%); styrene (50%)-isobutylene (40%)-isoprene (10%).

Briefly summarized, the test results indicated that the modified styrene resins with molecular weights in the range of about 30,000 to 70,000 are of special value for blending with the copolymers. Such modified resins have intrinsic viscosities between 0.2 and 1.0.

Also, such modified styrene resins with intrinsic viscosities close to 1.0 but not higher than about 1.3 have suitable fluidity in the region of 185° C. and 225° C. for injection molding, and this region is in the operating range of most commercial injection-molding equipment.

The extent of the modification treatment depends on the length of time that the polymer is maintained in solution with the active catalyst and the temperature at which the solution is held. The modification treatment is abruptly ended by addition of a liquid which precipitates the polymer from the solution, by addition of a material which deactivates the catalyst in the solution, by evaporation of the solvent from the reaction solution, or any combination of such steps.

A convenient method for conducting the modifying treatment involves mixing the low temperature polymerization reaction solution containing the dissolved high molecular weight polymer with a diluent, such as propane, in reducing the temperature, and then maintaining the diluted solution at a fixed temperature above −78° C. The diluent vapors may be condensed, refrigerated, and recycled to the reaction zone. In this type of treatment the temperature of the reaction solution may be maintained, for example, at the boiling point of propane (−40° C.) under atmospheric pressure or at a lower temperature under increased pressure with refrigeration with solid carbon dioxide. With methyl chloride itself boiling, the modifying treatment may be conducted at about −25° C. At a still higher temperature a higher boiling diluent may be used. Likewise, for efficient and simplified practice of the treatment, the temperature may be maintained at about the boiling point of ethyl chloride, or at about 40° C., or the boiling point of methylene chloride.

With the present understanding of the low temperature polymerization of styrene, the preparation of styrene resins is adaptable to a continuous operation with advantages of greater productivity and automatic control.

The homogeneous polymerization reaction solution may be passed as a stream continuously through a reaction zone in a predetermined reaction period before separation of the solid polymer product or before further modification of the polymer product. In this type of operation the low temperature polymerization of styrene differs from other low temperature polymerization reactions in which the polymer becomes precipitated as it is formed.

The modifying treatment described in connection with the polymerization of styrene is also applicable to resins formed by additive or homopolymerization of styrene derivatives, such as alkyl substituted styrenes, in forming commercially useful resins, but it is important to maintain the temperature of the modifying treatment sufficiently high to assure homogeneous solution of the resin.

The low temperature polymerization of alpha methyl styrene is similar to that of styrene except that the resulting polymer is less soluble in methyl chloride at −100° C. than is the styrene polymer. However, on warming up the reaction solution to −70° C., all the alpha methyl styrene polymer becomes dissolved.

Variation in the temperature of formation of the alpha methyl styrene polymer has the same effect as in the formation and modification of the styrene polymer. For example, the alpha methyl styrene polymer prepared at about −100° C. has an intrinsic viscosity of 0.32 or above 0.3, whereas, by raising the temperature of the reaction solution to −70° C. the intrinsic viscosity of the polymer is reduced to 0.13, and the polymer maintained at −25° C. becomes an oil in about the same period.

An interesting fact about the alpha methyl styrene polymer is that its softening point is high (190° C., the heat softening bar test), despite its relatively low intrinsic viscosity (0.32). A styrene resin of the same intrinsic viscosity has a softening point only slightly above room temperature. With the modifying treatment, useful alpha methyl styrene resins having intrinsic viscosity values in the range from 0.1 to about 0.3 may be prepared.

Alpha methyl styrene polymers differ from polystyrene in other ways. They cannot be alkylated at low temperatures and cannot be sulfonated with fuming sulfuric acid under the usual conditions. These facts in addition to those already mentioned, namely, the high softening point for a corresponding low intrinsic viscosity and the ineffectiveness of peroxide catalysts in thermal polymerization, indicate that alpha methyl styrene tends to polymerize in a manner different from that established for polymerization of styrene.

Styrene has been considered to polymerize in the following manner:

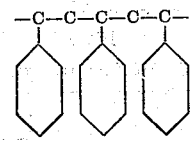

Such a chain has the aromatic nuclei attached in a manner which yields ordinary reactions common to a benzene ring, such as sulfonation, alkylation, etc., to take place.

It appears that the alpha methyl styrene may polymerize to have methyl groups in the alkylene linkage.

The profusion of methyl groups in such a structure would tend to give enough steric hindrance to prevent the aromatic groups from undergoing the normal reactions as has been pointed out to be true of the polystyrene polymers.

The alpha methyl styrene polymers of high molecular weight were found to be compatible with copolymers of styrene and olefins and accordingly may be used as an addition agent for raising the heat softening point of such copolymers.

The alpha methyl styrene polymer resins of suitable plasticity may also be used for forming into sheets or extrusion into rods.

Using the same procedure described for the low temperature catalytic formation and modification of styrene and alpha methyl styrene polymers, it was found possible to form and modify polymers of alpha methyl paramethyl styrene, and paramethyl styrene.

The alpha methyl paramethyl styrene was polymerized at −103° C. in methyl chloride by use of an aluminum chloride catalyst. The high melting point polymer thus obtained is soluble in the catalyst solution at −25° C., and becomes modified at this temperature or higher temperatures while kept in solution.

Application of the low temperature catalytic treatment to another alkyl styrene or aryl alkene is illustrated in the treatment of polymers of alpha ethyl phenyl ethene or ethyl vinyl benzene. The polymers were formed in a methyl chloride solution of aluminum chloride, and modified at above the vaporization temperature of methyl chloride in steam distillation.

Other polymers to which the treatment is applicable in a manner similar to that used in modifying polystyrene are polyhalostyrenes, e. g., p-chloro-phenylethene, dichlorophenyl ethene, p-bromophenyl ethene. These polyhalostyrenes are likewise formed at temperatures below −78° C. in an alkyl halide solvent with a Friedel-Crafts catalyst and can be kept dissolved in the solvent with the catalyst at temperatures ranging from −78° C. to 40° C.

It is to be noted that the described modifying treatment is particularly adapted for modifying high molecular weight polymers formed from styrene (phenylethene) and of its derivatives which are herein defined as aryl alkenes. In these derivatives the aromatic nucleus or aryl radical may contain a substituent group, e. g., a methyl or halogen group; also, the ethene or alkene side chain may contain a substituent, e. g., a methyl or halogen group, preferably in the alpha position. Interpolymers or copolymers of these monomers are also subject to the treatment, and are similarly formed by the low temperature polymerization with a Friedel-Crafts catalyst.

The modified polymers have a large number of uses, but are particularly suitable for injection molding to produce such articles as refrigerator parts, battery parts, etc. They may be used together with suitable fillers, dyes, compatible resins, plasticizers or other agents. The modified polymers may be used in coating compositions, adhesives, etc. The relatively low molecular weight polymers retain desirable properties of color, chemical resistance, and heat stability, but are more readily soluble in substances such as drying oils.

The invention is not to be limited to any of the specific examples described, for it is intended to claim all novelty inherent in the invention, including modifications which come within the spirit thereof.

We claim:

1. The method of modifying polystyrene having a molecular weight above about 80,000, which comprises dissolving said polystyrene in a solution containing an active aluminum halide catalyst dissolved in a lower alkyl halide of 1 to 2 carbon atoms, maintaining the resulting solution at a temperature of −25° C. to 5° C. a sufficient time for the dissolved polystyrene to undergo modification with decrease in its molecular weight to about 30,000–70,000, and thereafter precipitating the thus modified polystyrene from the solution.

2. In the method described in claim 1, said aluminum halide being aluminum chloride, and said solvent being selected from the class consisting of methyl chloride, ethyl chloride, and methylene chloride.

3. The method of modifying a polystyrene resin having a molecular weight above 80,000 and an intrinsic viscosity above 1.0 in toluene at 20° C., to reduce its molecular weight and improve its compatibility with styrene-olefin copolymers having at least 40% combined styrene, which comprises dissolving said polymerized polystyrene in a solution containing aluminum chloride dissolved in a lower alkyl halide of 1 to 2 carbon atoms, maintaining the resulting solution at a temperature of −25° C. to 5° C. for a sufficient time to reduce the intrinsic viscosity of said polystyrene to the range of 0.9 to 0.2, and thereafter precipitating the resulting modified polystyrene from the solution.

4. The method of modifying a polystyrene resin having an intrinsic viscosity of about 1.17, to reduce its molecular weight and improve its compatibility with styrene-isobutylene copolymers having about 40 to 60% combined styrene, which comprises dissolving 10 grams of said polystyrene in 600 grams of a mixture of equal parts by weight of methyl chloride and ethyl chloride containing 0.85 gram of aluminum chloride dissolved therein per 100 cc. of mixed chloride solution, and maintaining said solution at −25° C. for 20 minutes, and precipitating the resulting modified polystyrene having an intrinsic viscosity of 0.84 from said solution.

WILLIAM J. SPARKS.
DAVID W. YOUNG.

REFERENCES CITED

The following references are of record in the file of this patent:

UNITED STATES PATENTS

| Number | Name | Date |
| --- | --- | --- |
| 1,938,529 | Werntz | Jan. 22, 1935 |
| 2,400,129 | Nelson | May 14, 1946 |

OTHER REFERENCES

Mesrobian et al.: J. Am. Chem. Soc. 67, 785–787 (May 1945).